(12) United States Patent
Marchegiani (10) Patent No.: US 7,835,970 B1
(45) Date of Patent: Nov. 16, 2010

(54) METHOD AND SYSTEM FOR AUTOMATED AUCTION AND TENDER OF COMPLEX MULTI-VARIABLE COMMODITIES

(75) Inventor: Boris V. Marchegiani, Miami, FL (US)

(73) Assignee: CMVT, LLC, Portsmouth, NH (US)

( * ) Notice: Subject to any disclaimer, the term of this patent is extended or adjusted under 35 U.S.C. 154(b) by 0 days.

(21) Appl. No.: 09/496,389

(22) Filed: Feb. 2, 2000

(51) Int. Cl.
*G06Q 40/00* (2006.01)
*G06F 7/00* (2006.01)
*G06F 17/00* (2006.01)

(52) U.S. Cl. .......................... 705/37; 707/609; 707/36; 707/36 R; 707/705

(58) Field of Classification Search .................. 707/1, 707/10, 100, 102, 104.1, 200, 609, 705; 705/28, 705/29, 35, 36, 37, 38, 39, 80, 400, 26, 1, 705/10, 36 R; 709/203, 204; 710/241
See application file for complete search history.

(56) References Cited

U.S. PATENT DOCUMENTS

| | | | | |
|---|---|---|---|---|
| 3,581,072 | A | | 5/1971 | Nymeyer ...................... 705/37 |
| 4,677,552 | A | | 6/1987 | Sibley, Jr. .................... 705/37 |
| 4,903,201 | A | | 2/1990 | Wagner ....................... 705/37 |
| 5,168,446 | A | * | 12/1992 | Wiseman ..................... 705/37 |
| 5,285,383 | A | | 2/1994 | Lindsey et al. ................ 705/26 |
| 5,347,452 | A | * | 9/1994 | Bay, Jr. ........................ 705/37 |
| 5,428,606 | A | * | 6/1995 | Moskowitz ................ 370/400 |
| 5,495,412 | A | * | 2/1996 | Thiessen ........................ 705/1 |
| 5,615,269 | A | * | 3/1997 | Micali .......................... 705/80 |
| 5,640,569 | A | | 6/1997 | Miller et al. ................ 710/241 |
| 5,715,402 | A | | 2/1998 | Popolo ......................... 705/37 |
| 5,724,524 | A | | 3/1998 | Hunt et al. .................... 705/37 |
| 5,794,212 | A | * | 8/1998 | Mistr, Jr. ...................... 705/26 |
| 5,794,219 | A | | 8/1998 | Brown ......................... 705/37 |
| 5,842,178 | A | | 11/1998 | Giovannoli .................. 705/26 |
| 5,873,071 | A | | 2/1999 | Ferstenberg et al. ........... 705/37 |
| 5,890,138 | A | | 3/1999 | Godin et al. ................... 705/26 |
| 5,905,974 | A | | 5/1999 | Fraser et al. ................... 705/37 |
| 5,905,975 | A | | 5/1999 | Ausubel ....................... 705/37 |
| 5,950,177 | A | | 9/1999 | Lupien et al. ................. 705/37 |
| 5,950,178 | A | | 9/1999 | Borgato ........................ 705/37 |
| 5,970,476 | A | | 10/1999 | Fahey .......................... 705/28 |

(Continued)

FOREIGN PATENT DOCUMENTS

WO     WO 99/05629     *     7/1998

OTHER PUBLICATIONS

"Merrill Lynch bearish on gold, silver"; Metals Week, vol. 69, No. 23; Jun. 8, 1998; p. 1.*

*Primary Examiner*—Ella Colbert
(74) *Attorney, Agent, or Firm*—Ward & Olivo (57) ABSTRACT

A system and method for the auction and tender of complex multi-variable commodities, which are defined as commodities having a plurality of characteristics with each characteristic's value contributing to the determination of the commodity price. The system and method are implemented using an exception handling process whereby a tender participant requests exceptions to the terms and conditions of the original tender. The original tender serves as the baseline tender all participants bid on. Exceptions are changes that are priced in addition to the baseline bid. The suggested auction and tender winners are determined based on the their baseline bids. The winner can execute accepted exceptions for an additional fee.

14 Claims, 8 Drawing Sheets

U.S. PATENT DOCUMENTS

| | | | |
|---|---|---|---|
| 5,983,205 A | 11/1999 | Brams et al. | 705/37 |
| 5,991,739 A | 11/1999 | Cupps et al. | 705/26 |
| 6,058,379 A * | 5/2000 | Odom et al. | 705/37 |
| 6,115,698 A * | 9/2000 | Tuck et al. | 705/37 |
| 6,240,400 B1 * | 5/2001 | Chou et al. | 705/37 |
| 6,421,653 B1 * | 7/2002 | May | 705/37 |
| 6,493,683 B1 * | 12/2002 | David et al. | 705/37 |
| 7,330,826 B1 * | 2/2008 | Porat et al. | 705/26 |

\* cited by examiner

METHOD AND SYSTEM FOR AUTOMATED AUCTION AND TENDER OF COMPLEX MULTI-VARIABLE COMMODITIES

FIELD OF THE INVENTION

The present invention relates to a method and system for the automated auction and tender of complex multi-variable commodities. More particularly, it relates to a system and method which facilitates transactions in prerefined petroleum and other petroleum products.

BACKGROUND INFORMATION

Complex commodities may include any commodity whose price determination is based on a variation of each one of a plurality of variable characteristics. Simple commodities, on the other hand, are commodities whose characteristics are expected to match the quality requirement for a single characteristic. For example, steel is a simple commodity, where a steel gauge value denotes a number of characteristics which meet a minimum quality requirement. Also, gasoline is a simple commodity where grade (e.g., super, plus, regular, unleaded, etc.) covers a minimum quality value (i.e., an octane value) of other characteristics. Unlike simple commodities, diamonds, for example require a classification by a number of characteristics such as, among other things, color, clarity, cut, and shape. Another example of a complex commodity is a product or other entities dealing with various commodities (e.g., petroleum products) which have numerous qualities or characteristics that can determine price such as, e.g., viscosity, sulphur content, pour point, flash point, sodium content, and ash content for fuel oil number 6.

Numerous auction Internet web sites exist for simple commodities but do not offer varying specifications for the plurality of characteristics which are part of the complex commodities.

Historically, auctions have evolved in a number of different forms. The three most common types of auction are ascending bid auctions, Dutch auctions, and reverse auctions. In an ascending bid auction (which is the most common form of an auction), the price bid is successively raised until only one high bid remains. In a Dutch auction, the opposite of an ascending bid auction, an auctioneer begins with a high price which is incrementally reduced until the first bidder accepts the current price offered. In a reverse auction, buyers submit sealed bids unaware of the other bids and the highest bidder wins. A contract tender system is a form of reverse auction where the commodity being offered is the contract. Automated forms of all three auctions are found on the Internet.

In an automated network environment such as the Internet, the auctions are typically conducted at particular Internet web sites established as exchanges to facilitate the transacting of goods. Typically, an exchange allows a plurality of buyers to place bids that are matched to offers from a plurality of sellers. A number of these exchanges exist catering to a large variety of goods. However, the exchanges providing the auctions for the complex commodities are uncommon because the variation of several characteristics that determine price often frustrates exchanges grouping multiple buyers with multiple sellers.

U.S. Pat. No. 5,950,178 describes one example of such exchange for the complex commodities. In particular, this publication relates to an automated system and method for facilitating the transactions in diamonds. The system allows the sellers to offer their commodity, diamonds or precious stones, at a specified offer price and buyers enter their bid price for the commodity. The exchange described in this patent matches, the offers and bid prices. Unlike the exchange described in this publication, the method and system according to the present invention provides that each auction is a separate auction where the buyers bid on the specific output of a seller, or sellers bid to supply the needs of a specific buyer rather than a multi-buyer to multi-seller exchange. Additionally, the present invention addresses the need for an automated exchange for trading of, e.g., prerefined petroleum products, where the variable characteristics of the commodity are accounted for in the price determination.

The plurality of variable characteristics that affect the price determination should be the physical characteristics of the commodity, and not the external characteristics such as the point of delivery or the transportation. Accounting for the external factors or dividing a commodity into certain classes does not identify the particular good as the complex commodity. Transportation may be a separate item which is distinct from the commodity itself. For example, U.S. Pat. No. 5,724,524 describes a system for listing, brokering, and exchanging a carrier capacity which can be used for transporting the commodity. However this system does not relate to the physical characteristics of the commodity being transported.

With respect to petroleum products, OPEC and non-OECD national oil companies produce approximately 51 million barrels per day of crude oil. A substantial amount of this production is refined and marketed as petroleum products. Currently, the primary marketing method utilized by the National Oil Companies (NOCs) is tenders that provide prospective buyers the opportunity to bid on available supply or in some instances sales to the NOC's. In most instances, these tenders take the form of fax bid offerings to approved customers. Otherwise, the bid process is conducted via the phone. The system, as it currently exists, often causes various problems which range from simple communication problems to more serious situations. In particular, the lack of the standardized and thorough distribution of information along with the possible exclusion or marginalization of potential bidders makes the current bidding process less than optimal. The above example can also be implemented for other complex commodities.

Automated system and method according to the present invention for the exchange of the complex commodities are currently not available. The current Internet based sites are, at best, bulletin boards posting information, but do not allow for the online automated auctions and tenders to take into account the multiple characteristics of the complex commodities.

SUMMARY OF THE INVENTION

The present invention addresses the need for the automated method and system for the auction and tender of complex multi-variable commodities, e.g., in the field of petroleum products.

The present invention includes such system and method. In particular, a central clearinghouse host site is provided where each of the individual auctions or tenders are conducted. Buyers and sellers may access the site via the respective user connection devices across the respective connection arrangements such as the Internet, direct satellite link, etc.

Users of the system can post tenders, view tenders, and bid on the tenders currently existing on the system. Consistent information is made available to all designated participants with instantaneous information dissemination. The tender adjudication may be automated or left to the tender initiator (e.g., the posting party) to allow the law which governs the transaction to have the full effect.

By using the system and method according to the present invention, the traditional bidding process can be greatly improved, thereby providing the tender initiators and the tender recipients and buyers with numerous advantages. The interne communications offers instantaneous and consistent information to all prospective clients. For example, using such communications, each company receives the same information at the same time. Problems such as, e.g., an access to fax machines, unclear faxes, inability to contact the individuals with the necessary telephone calls are reduced. Additionally, the tender validity period and the time parameters of the tender can be tailored to match the time zones of the market for the anticipated buyers. These efficiency benefits also apply in the converse situation where a buyer creates a tender for sellers (such as the NOCs) to supply the petroleum products.

In addition to these exemplary efficiency gains, the system and method of the present invention a flexibility improvement. For example, a host site provides a clearinghouse for the auctions and a standardized location for interested parties to be interconnected. This host site permits a timely distribution and update of information to all of the interested parties. The flexibility of altering customer profiles, authorized participants for a tender, or users authorized viewing privileges for a tender provides a considerable improvement over the conventional practice.

Other advantages of the system and method include facilitating an integrity over the data for allowing the bids to be anonymously provided until the tender adjudication is performed following the conclusion of the tender validity period. The bids can be entered on a real-time basis with an instantaneous feedback to other bidders for providing a more efficient system yielding more accurate and optimal results from both the seller and the buyer perspectives. These benefits can also reduce the transaction costs related to the sale the products, thereby increasing the profit margin for the product or decreasing the price (depending on whether a tender is provided for the purchase or the sale of, e.g., the petroleum products). Additionally, the tracking of the tender and the bidding information is a valuable feature, and cannot be as easily or as thoroughly accomplished using the conventional systems and methods.

The present invention also provides a system in which a buyer or seller can post a tender. The tender participants (e.g., the tender recipients) can be limited by the tender initiator, and those who are granted access to view (but not bid on) the tender can also be controlled and limited by the tender initiator. The authorized users can also view the open tenders with the current bid information except for viewing the sealed envelope bidding. The designated participants may also bid on the tenders. Another exemplary feature of the present invention is the exception handling which allows the complex multi-variable commodities to be traded according to the different buyer and seller demands, terms and specifications that determine the value of the particular commodity.

The exception handling may be accomplished by, e.g., maintaining a baseline tender as posted by the tenderer. The initial conditions and terms with the posted tender remain as the baseline. The participants in the tender can request the exceptions from the tenderer. If the tenderer agrees, the accepted exceptions are added to the tender and are provided in addition to the baseline. For example, in a tender for fuel oil number 6, the posted tender may specify a viscosity of 350 SSF. This becomes the baseline viscosity for the tender. Then, the tender recipient may request an exception which requires a viscosity of 300 SSF. If the exception is accepted, it is maintained as an additional item for the tender. When the tender recipient bids on the tender, they enter the "per barrel" price that they are willing to pay for the product with a viscosity of 350 SSF. The winning bidder has the option to take delivery of such fuel oil. However, the accepted exception for a viscosity of 300 SSF may exist for an additional cost of $0.10/barrel. Therefore, the winner could also take delivery of fuel oil number 6 with the viscosity of 300 SSF for $0.10 per barrel above their winning bid. This exception handling feature of the system according to the present invention allows each user to request the exceptions that may be important to them while the tenderer is not required to accept any exceptions, and may do so for an additional fee if they are able to comply.

DETAILED DESCRIPTION

Figure 1:
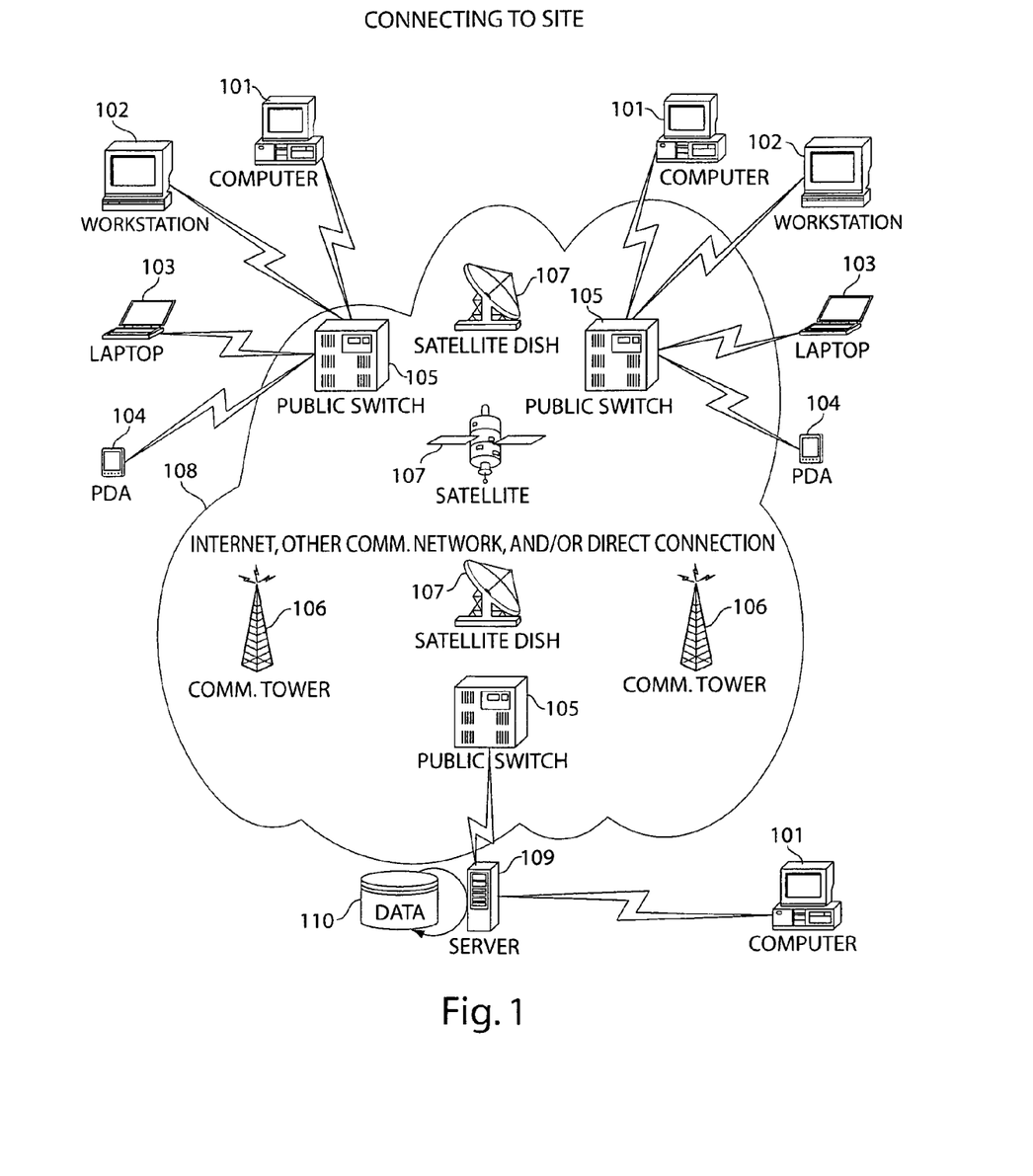
FIG. 1 shows a diagram of an exemplary embodiment of a networked system connecting a plurality of users in order to conduct the automated auction and tender of complex multi-variable commodities according to the present invention.

FIG. 1 shows a diagram of an embodiment of a networked system connecting a plurality of users to a host site for conducting an automated auction and tender of complex multi-variable commodities. The plurality of users can access the host site through a plurality of devices which may include, e.g., personal computers 101, workstations 102, laptops 103, and personal digital assistants (PDAs) 104. These user connection devices may communicate with a host site server 109 in a number of ways. In an advantageous embodiment of the present invention, the user connection devices communicate with the host server 109 across the Internet 108 via data, voice, and/or using mixed public switches 105. At various stages of the connection or in alternative embodiments, the communication may also be implemented using a satellite connection 107 or a wireless connection 106. In an alternative embodiment of the present invention, a direct connection can be made between the user connection device and the host site server 109 using a modem connection across voice or data lines through various public switches 105. The direct satellite connection 107 between the user connection device and the host site server 109 is also possible.

Accessing the System

Figure 2:
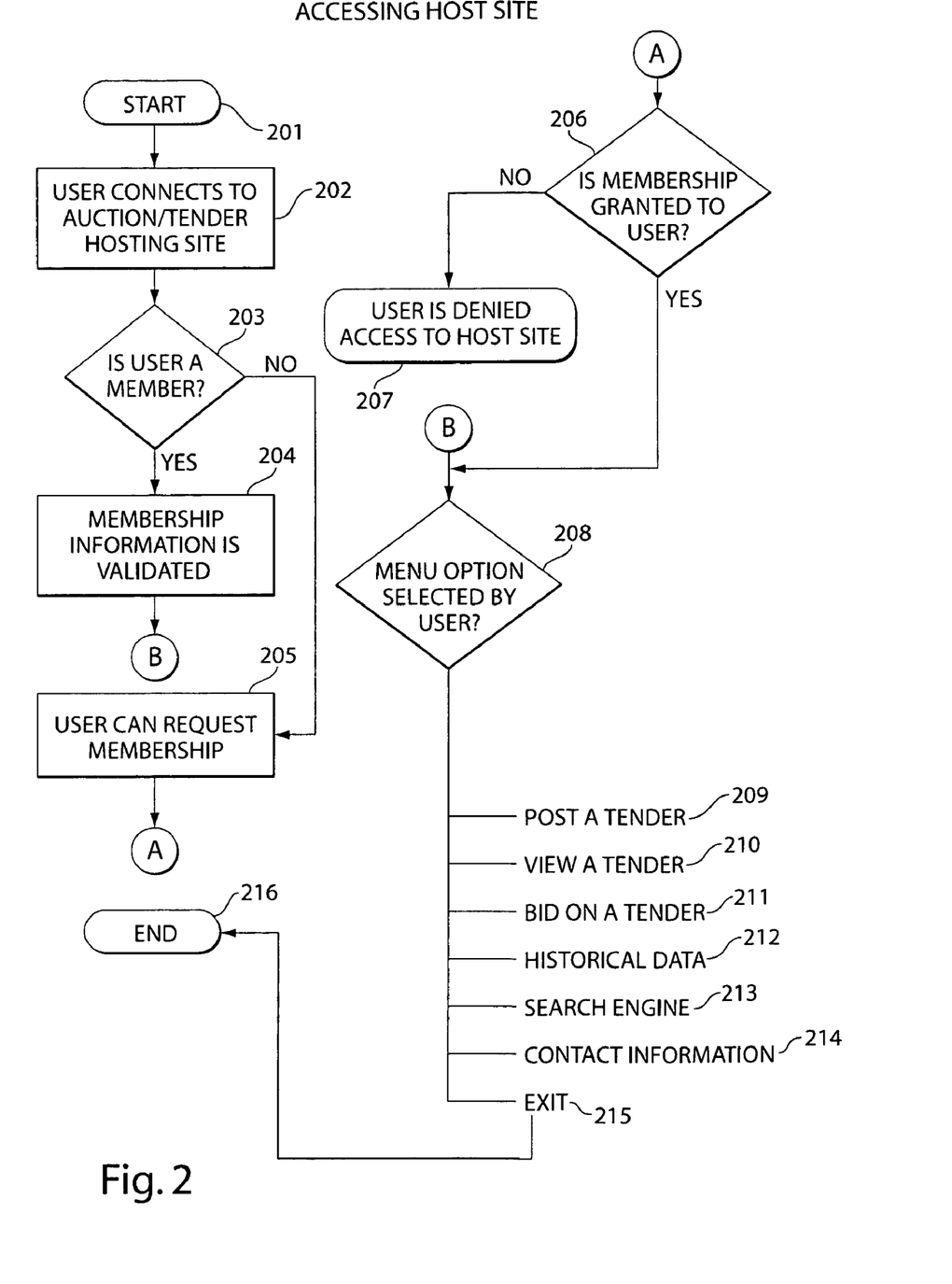
FIG. 2 shows a flowchart of an exemplary embodiment of a process to access a system, and menu of exemplary options for the automated auction and tender of the complex multi-variable commodities according to the present invention.

An exemplary embodiment of the connection process according to the present invention is provided in the flowchart shown in FIG. 2. When a user decides to access the auction and tender system for complex multi-variable commodities (step 201 hereinafter "System") via the user connection device, the user first connects to the host site (step 202). Once connected, the System prompts the user for membership information which may include, e.g., a company name, a user name, and a password. If the membership information is entered (step 203), the data is evaluated to determine what options and permissions the user may be granted (step 204). If the user is not a member of the system, an option to request a membership may be available online (step 205). If a user inputs the necessary information for the membership (step 205), a determination is made either automatically or manually, with or without delay on whether the user is granted a membership to the System (step 206). If the user is denied a membership or the user enters invalid membership information, the user is denied access to the System (step 207). If the user is granted a membership, the user may be required to enter the membership information to login into the System or may directly be admitted into the System if the membership grant is made with a minimal delay. Whether the user logs-in following the grant of the membership (step 206) or during the initial connection with the System 204, the user may be presented with a plurality of options (step 208).

The options to post a tender 209, view a tender 210, and/or on bid a tender 211 are further described in further detail below. Posting a tender option 209 is a fundamental task described in greater detail below and shown in FIGS. 3A and 3B. Likewise, viewing a tender option 210 is described below and shown in FIGS. 4A and 4B. Bidding on a tender 211 is described below and shown in FIGS. 5A and 5B. The historical data option 212 provides the display of either user specific data or tender historical data. The search engine option 213 allows the user to search the database of the System for particular information. These prototype options can be used when posting the tender in the System. The user may request contact information 214 and/or exit from the System 215. It should be noted that the embodiment of the options available in the System described above is only exemplary. Other options may be utilized in the system and method according to the present invention.

Posting a Tender

Figure 3A:
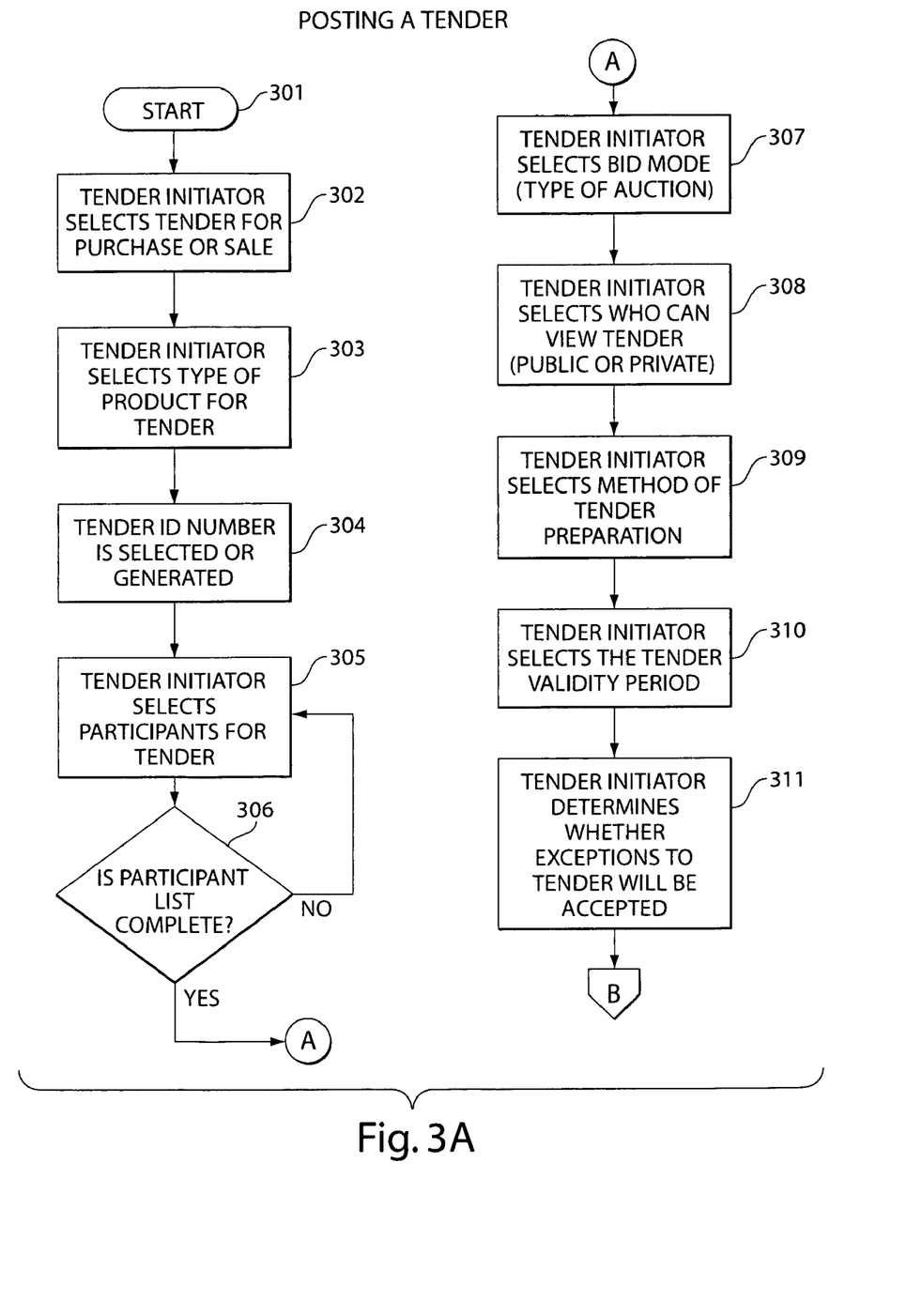
FIG. 3A shows a first portion of illustrating a flowchart of an embodiment of the process to post the tender for the purchase or sale of the complex multi-variable commodity.
Figure 3B:
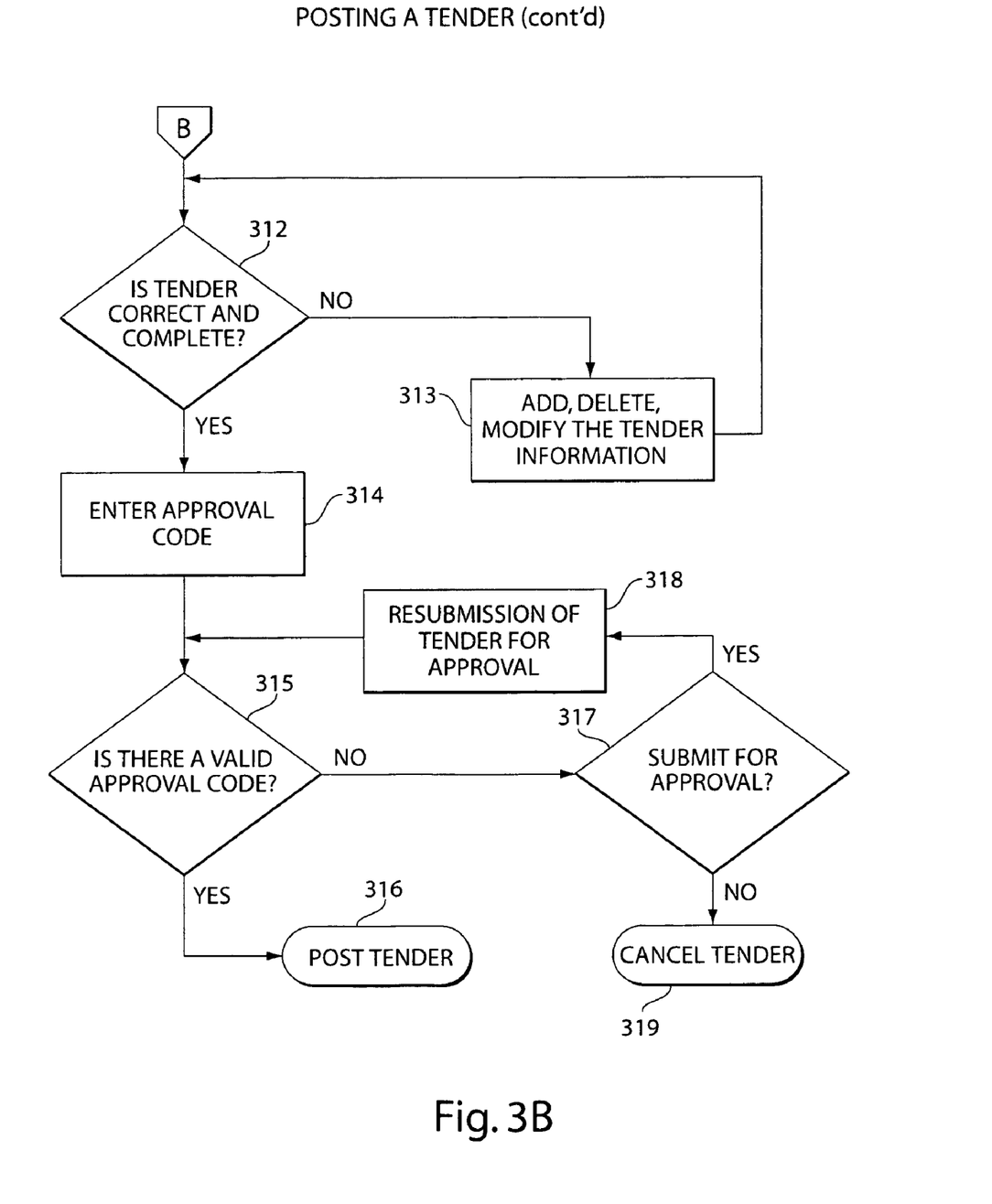
FIG. 3B shows a second portion of the flowchart of the embodiment of the process of FIG. 3A.

When the user (i.e., the tender initiator) opts to post the tender, a process is begun (step 301) as provided in the embodiment of the system and method of the present invention, and shown in FIGS. 3A and 3B. This user must first decide if the tender to be posted is for the purchase or sale of a commodity (step 302). Both types of the tender are possible which allow the sellers and the buyers to post the tenders on the System. The tender initiator should determine the type of commodity the tender covers (step 303). In the embodiment shown in FIGS. 3A and 3B, this selection is made from prerefined petroleum products. The tender initiator may also select a tender identification number to identify the tender (step 304). This identification number should be unique for all of the tenders or for each user. It is also possible for a user identification code, acronym, or name followed by the tender identification number to be used to uniquely identify the tender. Alternatively, the tender identification number can be automatically generated by the System.

Once the basic structure of the tender, has been determined, the tender initiator must decide who will be able to participate in the tender (step 305). This selection is made from a list of members provided in the System as a whole, a list of the members interested in a certain type of product (such as participants interested in crude oil) or a user defined subset of the members. It is preferable for the members to be provided in the System so that the selected party is able to view and bid on the tender. The selection of the members authorized to participate in the tender may be updated at any time to reflect the addition of new members in the System. The tender initiator continues the process of selecting the participants (i.e., the tender recipients) until the bidder list is complete (step 306).

In step 307, the selection of the bid mode is performed. In one advantageous embodiment of the present invention, two bid modes may be offered to the user (e.g., an auction, and a sealed envelope. The auction bid mode permits the tender initiator and the tender recipients to view the live process of the premiums, fixed offers, commodity characteristic variable values, and the exceptions (i.e., changes to the conditions and terms of the tender) on the screen or some other output device during the tender validity period. Additionally, it is possible to display charts showing the bid history on the display device during the tender validity period which provides the users a concise visual presentation of the bid value between the open of the tender until the tender adjudication. In one embodiment of the auction bid type, it is possible to provide a predetermined opening time for the tender offers (or bids) to be submitted by the tender recipients and a particular closing time for the tender offers. After the tender validity period has concluded, the bids will be accepted until a particular period point (e.g., a five minute period) in which no bids which are better than the current bid can be submitted. The tender will officially close at the conclusion of this particular period. During the tender open period and the tender closing period, the bidders remain anonymous with only the value of their respective bids being made available to the posting party. At the conclusion of the tender, the tender initiator may receive an official list of all bidders, their corresponding bids, and a suggested award order associated with the winning bid. The final decision on the tender winner may be made by the posting party (and not automatically be the System) so that all final decisions according to the applicable laws and regulations of the country whose law governs the transaction. According to the present invention, it is also possible to enable the System to automatically determine and confirm the winning bid at the end of the tender.

The second bid type according to the present invention may be a sealed envelope bid. For the sealed envelope bid type, the tender recipients submit their bids during the tender validity period. Unlike the auction bid type, the sealed envelope tender officially closes at the end of the designated tender validity period. During the tender validity period, the submitted bids can not be viewed by anyone other than the party which submitted the respective bid, i.e., neither by the other participants nor by the tender initiator. At the conclusion of the tender, the tender initiator receives an official list of all bidders, their corresponding sealed bids, and a suggested award order. As with the auction bid type, the final decision on the tender winner may be rendered by the tender initiator and/or by the System.

Next, after step after the selection of the bid type, it is determine who can view the tender (step 308). In this step, the nonparticipants may be granted a viewing access even though they are not authorized to bid on the tender. In one advantageous embodiment of the present invention, two viewing categories, i.e., the public tender and private tender may exist. In the public tender, all System user can view the tender and its related information. In a private tender, only the designated participants in the tender can view the tender and its related information. Other embodiments with additional categories of viewing authorization are also possible.

In step 309, the user (i.e., tender initiator) selects a method of the tender preparation. For example, the tender initiator may manually prepare the tender, attach an already prepared tender, or include a tender prototype. The manual preparation of the tender is performed in an online, interactive manner with the details of the preparation being dependent on the commodity being tendered. The tender should generally conform to certain minimum requirements to allow the tender recipients to have the information necessary for properly bidding on the tender. The tender prototypes are a rapid way of generating the tender; they may be entered with little or no changes to the existing and/or predefined terms.

In step 309, the tender validity period is generated. The validity period requires a start data and a stop date based on a predetermined time standard (e.g., the Greenwich Mean Time (GMT)). Other embodiments allow the selection of different time zones for the validity period generation. The designation of the time zone enables a conversion of the validity period by the System, e.g., GMT. The tenderer initiator should also decide whether any exceptions (e.g., changes in terms or conditions) are acceptable for the tender (step 311). If the posting party decides to accept the exceptions, the tender recipients are then allowed to request the exceptions. However, the acceptance of the exceptions will not necessarily be automatic, as later described below in a greater detail.

In step 313, the tender initiator reviews the tender for accuracy and completeness. If the tender is not acceptable, the posting party makes changes (step 313). Otherwise, once the tender is acceptable, the tender initiator may enter an approval code for the tender to be posted (step 314). In step 31, the approval code is validated. If a valid approval code is entered, the tender is posted (step 316). If no approval code was entered, the tender initiator is given the option to submit the tender for approval in step 317. If the user decides not to submit the tender for approval, the tender is canceled in step 319. Otherwise, if the tender initiator decides to submit the tender for approval, the tender is submitted to, e.g., the party authorized to officiate the tender. Once the tender is approved e.g., the appropriate approval code is assigned) the tender is resubmitted (step 318). Again, it is determined (by the System or the user) if a proper approval code has been provided (step 315). Once the tender is posted, all designated participants may access the tender and make bids during the validity period. Additionally, all parties who are given the viewing permission may view the tender and its associated details.

Viewing a Tender

Figure 4A:
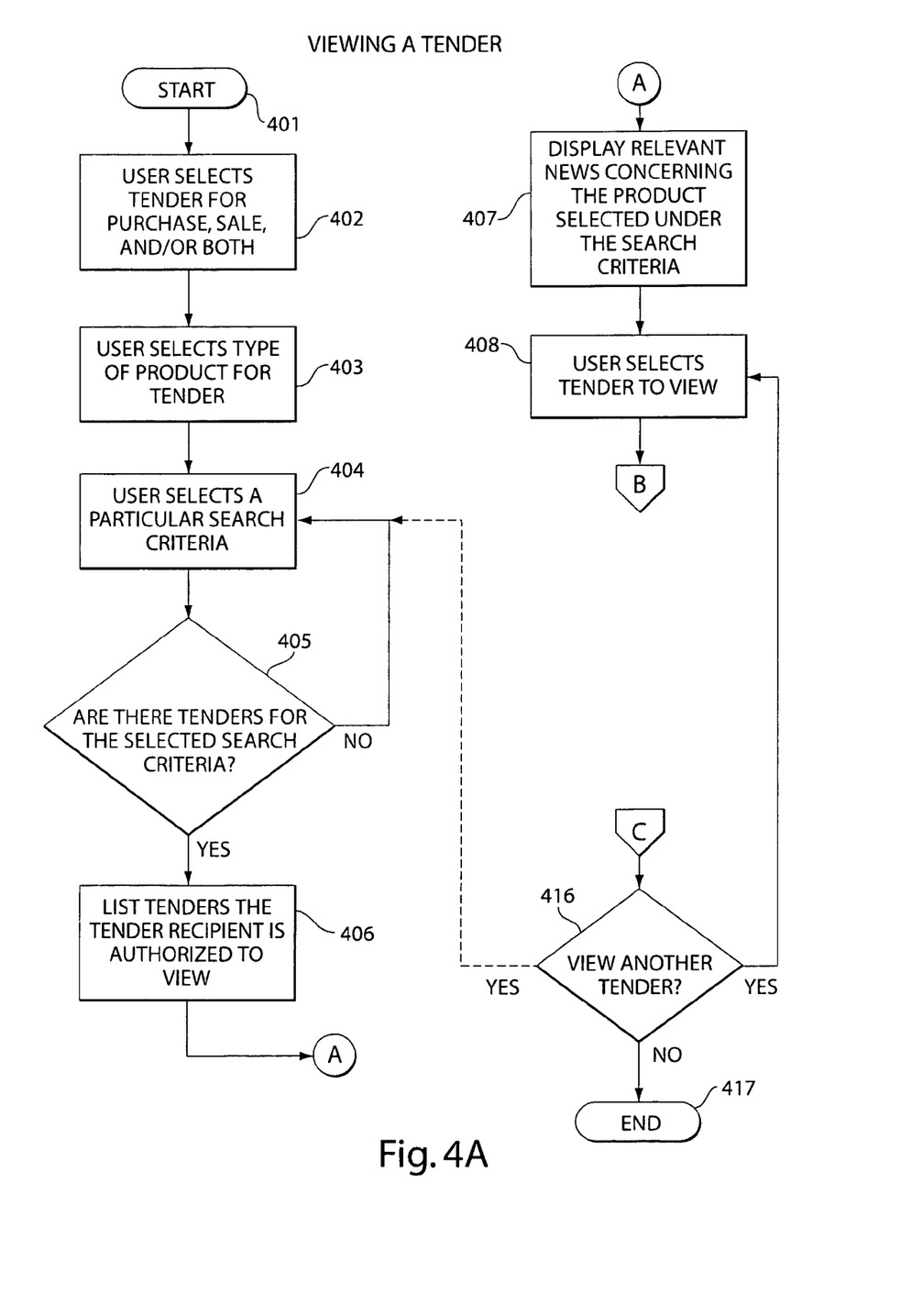
FIG. 4A shows a first portion of a flowchart illustrating an embodiment of the process to view the tender and to request changes in the conditions or the terms of the tender.
Figure 4B:
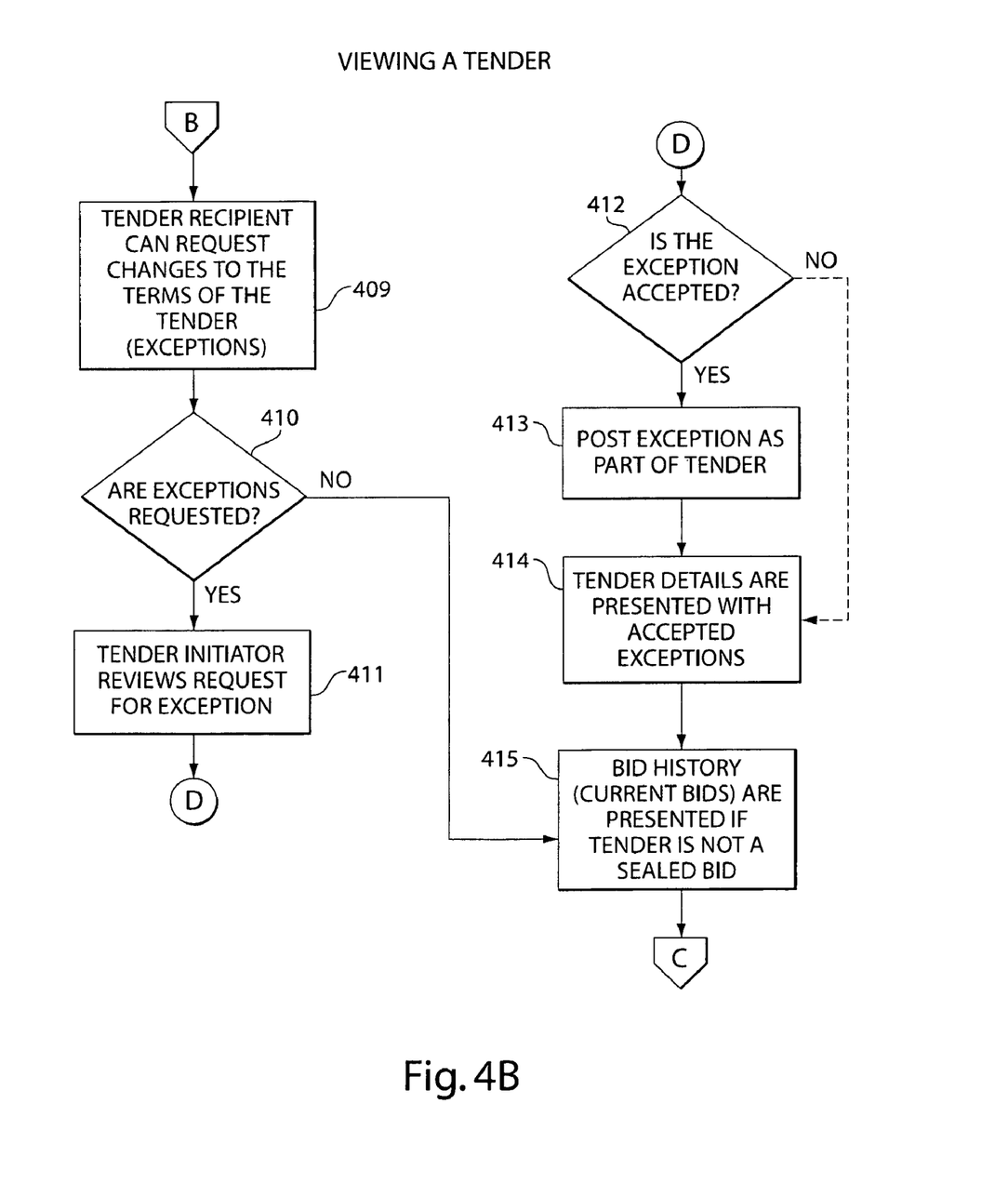
FIG. 4B shows a second portion of a flowchart illustrating an embodiment of the process of FIG. 4A.

When the user (e.g., either the tender initiator or the tender recipient) decides to view the tender, a process according to the present invention shown in FIGS. 4A and 4B) is initiated. This user first decides whether the type of the tender to be viewed is the tender for the purchase of a commodity, the sale of a commodity, or both (step 402). This selection depends on the needs and interests of the particular user. In step 403, the user then decides what type of commodity covered by the tenders is to be viewed. The user may indicate one or more categories of the commodity to be viewed. The omission of the commodity type may indicate that all commodities can be viewed and that all commodity types are available for viewing in the System.

Then, in step 404, the user specifies the search criteria or combination thereof (e.g., the country or the region whose tenders are to be examined). As with the commodity type, the user may skip the designation of the search criteria thereby including tenders from all tenders are to be examined. The tender recipient are able to enter multiple search criteria to allow the selection of the best viewing area for the tender recipient. Once the tender recipient specifies the search criteria whose tenders are to be examined in step 404, the System determines if there are any tenders in the specified area that the user is authorized to view (step 405). If there are no allowable tenders authorized, a message may be displayed informing the user (either the tender receiver or the tender initiator) of the status, and returning the user to the area specification (step 404). If there is one or more tenders for the specified area, the tenders which the user is authorized to view are displayed on a display device of the user (step 406).

Along with the tender listing, e.g., a table of news summaries with links to full articles may be displayed with news affecting the area and/or product specified (step 407). This exemplary feature allows the user to view the tenders in context with the current situation (e.g., news) affecting the region. For example, from the list of tenders that the user is authorized to view, the user may select a tender to be examined in detail (step 408). The tender details with all accepted exceptions are then displayed for the user.

The tender recipient may request changes to the terms and conditions of the tender as posted. These changes are called "exceptions". These exceptions, as well as the exception process are described in greater detail below.

After the exception requests are handled and new exceptions to a tender are posted, the tender information is again displayed with all accepted exceptions. If the bid type is not a sealed bid, the bid history which includes the current bids sorted by time during the tender validity period are displayed on the display device in step 415. Once the user finishes viewing the current tender, the user can view another tender from the list of authorized tenders for the search criteria selected in step 416 (shown in FIG. 4A as a solid line extending from step 416 to step 408) or the user may enter a new area for the tenders in step 416 (indicated by a dashed line extending from step 416 to step 404). The user may at any time decide to exit from the view tender option (step 417) and return to the System menu of options.

Exception Handling

Figure 5A:
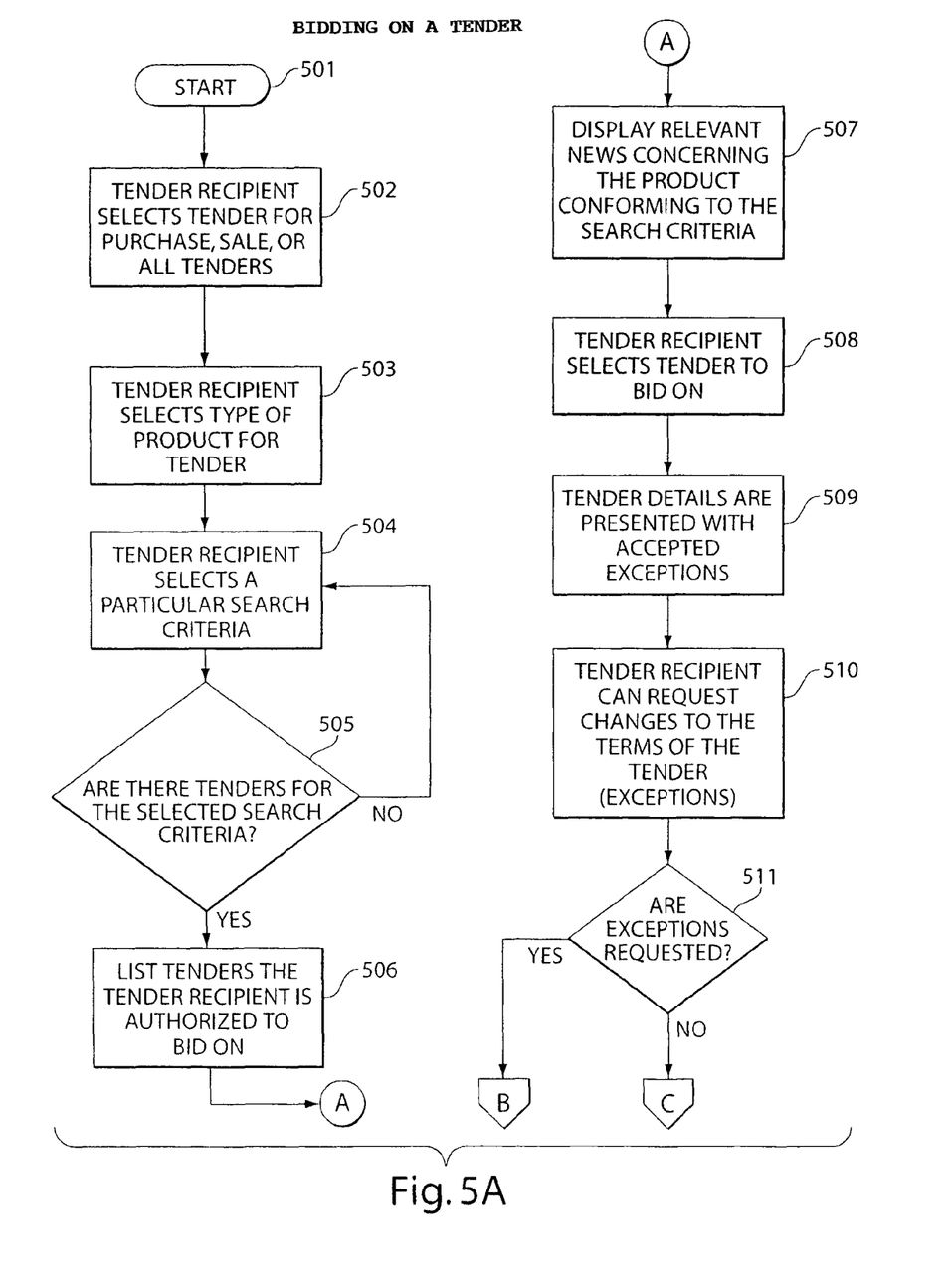
FIG. 5A shows a first portion of a flowchart illustrating an embodiment of the process to view the tender and to request changes in the conditions or the terms of the tender.
Figure 5B:
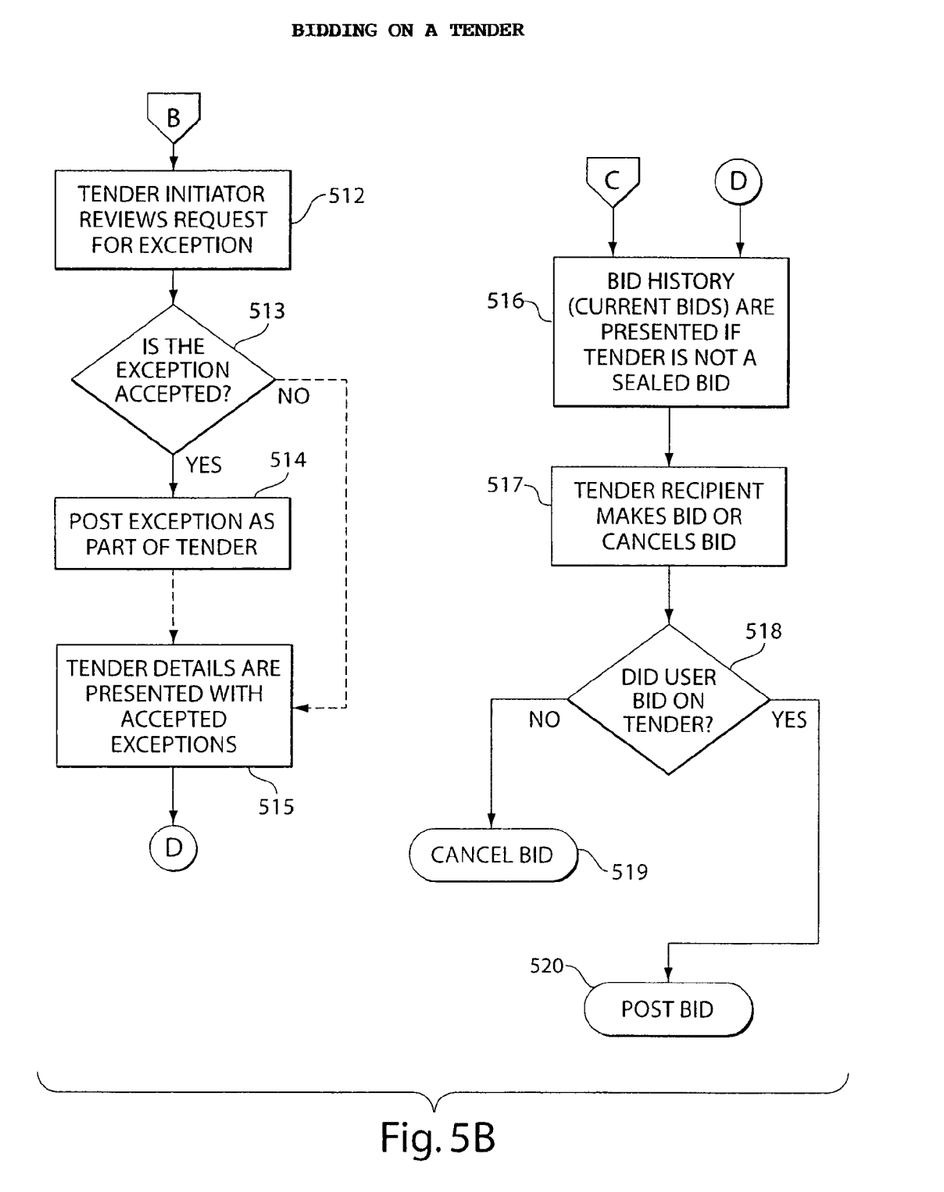
FIG. 5B shows a second portion of a flowchart illustrating an embodiment of the process of FIG. 5A.

As described above, the exceptions can be changes to the conditions or terms of the established tender. The original tender terms and conditions can be set by the tender initiator when the tender is first posted. The exception handling process is provided to accommodate the tender recipients who require changes to be made in the established tender. This process allows particular exceptions to be selected once they are deemed to be permissible for an additional cost. In addition, the process according to the present invention then allows all tender recipients to bid equally on the established tender with the winner being able to execute the accepted exceptions for an additional stipulated (or predetermined) price after winning the tender. An exemplary embodiment of the exception handling process is illustrated in FIGS. 4B, 5A, and 5B.

The exception handling process first begins in either the view tender option, the bid tender option or in both of these options. The exceptions are requested by the tender recipient in steps 409 (at a local server or a remote server), 510. However, the tender recipients who are given only viewing permission can not request the exceptions. Additionally, the exceptions are preferably requested only for the tenders where the tender initiator specifically permitted the exception requests when the tender is posted. If the tender recipient does not request the exception, the entire exception handling process can be bypassed in steps 410, 511. However, if the exception request has been submitted, the tender initiator generally review, the exception step 411, 512 and determine if the exception should be acceptable (in steps 412, 513), and what price to set for the particular exception. If the exception is accepted, such exception is then posted as a part of the tender in steps 413, 514. Once the exception request has been transmitted, and the exception has either been accepted or rejected (in steps 412, 513), the tender details are again presented to all designated tender recipients with all the accepted exceptions 414, 515. The dashed lines in FIGS. 4B and 5B illustrate a possible delay from first request to final determination regarding the exception. In reality, the exception handling process can be performed in a substantially instantaneous manner or with a delay depending upon the tender initiator who is monitoring of the System.

The exception handling process is generally advantageous at least because the multiple variable characteristics of a complex commodity can be accounted for, while at the same time, maintaining a large pool of the tender recipients who are bidding on basically the same tender.

Bidding on a Tender

When the tender recipient decides to bid on the tender, the process according to the present invention is initiated (step 501) as shown in FIGS. 5A and 5B. In step 502, the tender recipient decides whether to bid on the tender for purchase, the tender for a sale, or all types of tenders 502. The tender recipient's selection differs depending upon the needs and interests of such tender recipient. The tender recipient also specifies the type of the commodity that the tender recipient prefers to bid on (step 503). In the embodiment shown in FIGS. 5A and 5B, the tender recipient may indicate one or more categories of the commodity to be viewed. The omission of a particular commodity type indicates all commodities should be selected and that all commodity types available in the System (e.g., in the database thereof). In an alternative embodiment of the present invention, the omission of a particular commodity type may generate an error message requiring the tender recipient to specify at least one commodity type before proceeding.

The tender recipient then specifies the search criteria (e.g., the country or the region) for which the tenders are to be examined in step 504. The tender recipient may skip the designation of the search criteria. The tender recipient may enter multiple search criteria. Once the tender recipient specifies the search criteria in step 504, the System (e.g., via the processing device) determines if there are any tenders conforming to the selected search criteria that the tender recipient is authorized to participate in (step 505). If there are none, a message may be displayed on the tender recipient's display device informing the tender recipient of the status and returning the tender recipient to step 504. If there is one or more tenders that match the search criteria, the tender recipient is authorized to participate in those tenders, and they are also displayed on the display device (step 506).

Along with the list of the tender, a table of news summaries with links to full articles may also be displayed with the news affecting the product corresponding to the search criteria (step 507). This allows the tender recipient to view the tenders in the context of the current situation (news) which may affect the tender. From the list of the tenders that the tender recipient is authorized to participate in, the tender recipient may select the particular tender to be examined in detail and to bid on (step 508). The details of the tender with all accepted exceptions may be displayed for the tender recipient 509.

The tender recipient may then request changes to the terms and conditions of the tender as posted (i.e., the "exceptions"). These exceptions and the exception process have already been described above.

After the exception requests are processed, and new exceptions to the tender are posted to be viewed by the tender recipient, the tender information may again be displayed with all accepted exceptions. If the bid type is not a sealed bid, the bid history (which is a collection of the current bids which may be sorted by time during the tender validity period) are displayed in step 516. The tender recipient can then bid on the tender or cancel the current bid by exiting the bidder's process (step 517). If the participant places a bid on the tender, the bid should be provided in a standard form which is specified in the tender (e.g., U.S. Dollars per barrel), so that the bids may be easily compared, and the exchange rate fluctuations that can dramatically affect the bid price during the validity period are considered. If the tender recipient bids on the tender, the bid is posted in step 520 and other tender recipients with the viewing permission (and the tender initiator) can view the bid unless the tender is a sealed envelope tender. All bids are anonymous to all other bidders and to the tender initiator until the tender adjudication period (which follow the close of the tender period). Even at that time, only the tender initiator is provided with the identity of the various bidders. If the tender recipient does not bid on the tender, the bid is canceled and nothing is posted (step 519). Following the bid posting 520 or the bid cancellation 519, the tender recipient is either returned to the System menu to select an option the tender recipient is returned to the tender list where another tender to bid on can be selected, or a new area for tenders designated.

What is claimed is:

1. An automated auction and tender system for effecting electronic transactions between a tender initiator and a tender recipient, comprising:

a storage device for storing information regarding at least one tender of a multi-variable commodity, wherein the at least one tender having at least one term;

a processing device for generating the at least one tender, wherein the at least one tender is created by the tender initiator, and wherein the at least one tender includes an authorization to receive a request to change the at least one term of the multi-variable commodity, the request being submitted by the tender recipient;

a communication network for transmitting information, corresponding to the at least one tender, to the tender recipient, the communication network further configured for receiving the request from the tender recipient to change the at least one term of the at least one tender, wherein the at least one term is changed to create an amended tender in response to receiving the request, wherein the amended tender includes the at least one term and a changed term, wherein the amended tender is created upon accepting the request to change the at least one term received from the tender recipient, wherein the at least one term of the at least one tender that is changed relates to a physical characteristic of the complex multi-variable commodity.

2. The system according to claim 1, wherein the processing device executes a program on a remote device.

3. The system according to claim 1, wherein the storage device includes a database storing data which is related to the at least one tender.

4. The system according to claim 3, wherein the database is a relational database.

5. The system according to claim 1, wherein the processing device:

receives the stored information, wherein the stored information includes information for creating the at least one tender;

analyzes the stored information to create analyzed information, and transmits the analyzed information to a further processing device, wherein the analyzed information is transmitted in response to the stored information.

6. The system according to claim 1, wherein the processing device at least one of transmits and receives the information electronically via the Internet.

7. The system according to claim 1, wherein the processing device at least one of transmits and receives information electronically via a network of further processing devices.

8. A computer-implemented method for effecting electronic transactions between a tender initiator and a tender recipient, comprising the steps of:

storing, via a storage device in communication with the tender initiator, information regarding at least one tender of a multi-variable commodity having at least one term;

generating, via a processing device in communication with a network server, the at least one tender by the tender initiator, wherein the at least one tender includes an authorization to receive a request to change the at least one term of the multi-variable commodity;

transmitting, via a communication network, information corresponding to the at least one tender to the tender recipient;

receiving, via the communication network, a request from the tender recipient to change the at least one term, wherein the at least one term is changed to create an amended tender in response to receiving the request, wherein the amended tender includes the at least one term and a changed term, wherein the amended tender is created upon accepting the request to change the at least one term received from the tender recipient, wherein the at least one term of the at least one tender that is changed relates to a physical characteristic of the complex multi-variable commodity.

9. The computer-implemented method of claim 8, further comprising the step of executing, via the processing device, a program on a remote device.

10. The computer-implemented method of claim 8, wherein the storage device includes a database storing data which is related to the at least one tender.

11. The computer-implemented method of claim 10, wherein the database is a relational database.

12. The computer-implemented method of claim 8, further comprising the steps of:

receiving the stored information, wherein the stored information includes information for creating the at least one tender;

analyzing the stored information to create analyzed information, and transmitting the analyzed information to a further processing device, wherein the analyzed information is transmitted in response to the stored information.

13. The computer-implemented method of claim 8, wherein the processing device at least one of transmits and receives the information electronically via the Internet.

14. The computer-implemented method of claim 8, wherein the processing device at least one of transmits and receives information electronically via a network of further processing devices.

* * * * *